Figure 1:
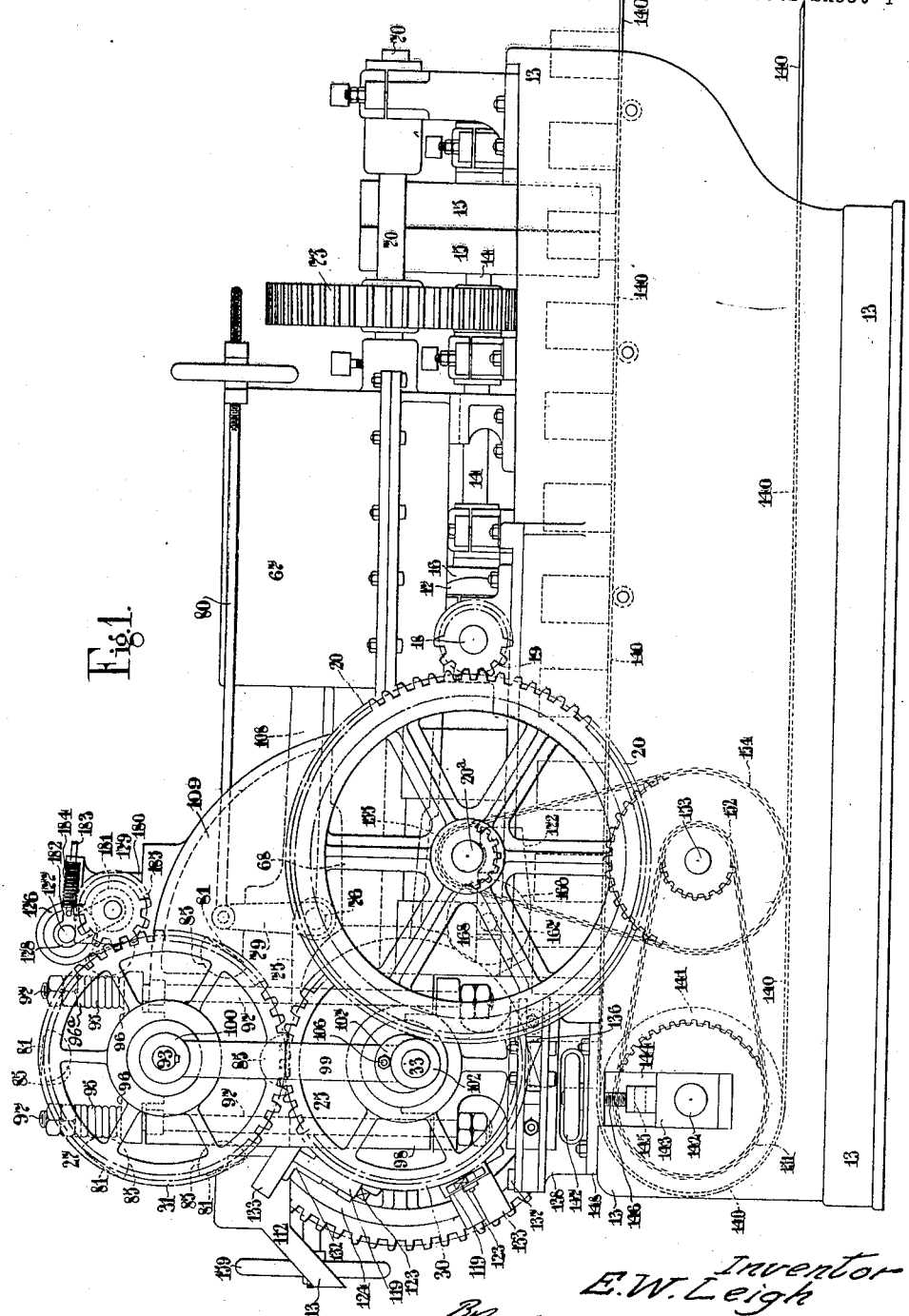

Aug. 12, 1924.

E. W. LEIGH 1,505,042

PRESS FOR THE MANUFACTURE OF HOLLOW EARTHENWARE ARTICLES

Filed Nov. 10, 1922

10 Sheets-Sheet 1

Inventor
E. W. Leigh
By Marker Cleek
Attys

Aug. 12, 1924. 1,505,042
E. W. LEIGH
PRESS FOR THE MANUFACTURE OF HOLLOW EARTHENWARE ARTICLES
Filed Nov. 10, 1922 10 Sheets-Sheet 4
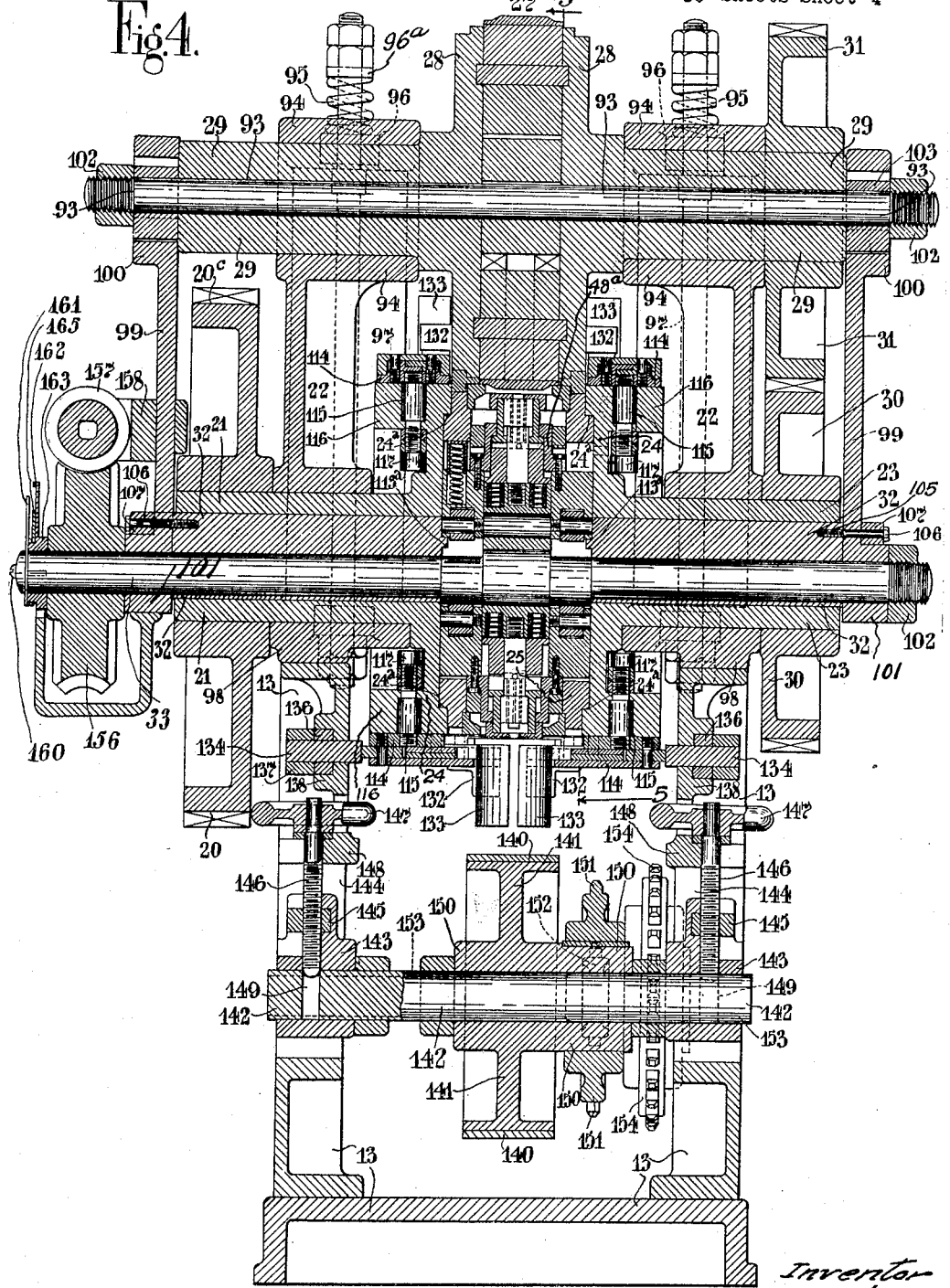
Fig. 4.

Aug. 12, 1924.

E. W. LEIGH 1,505,042

PRESS FOR THE MANUFACTURE OF HOLLOW EARTHENWARE ARTICLES

Filed Nov. 10, 1922    10 Sheets-Sheet 5

Inventor:
E. W. Leigh
By Marks & Clerk
Attys.

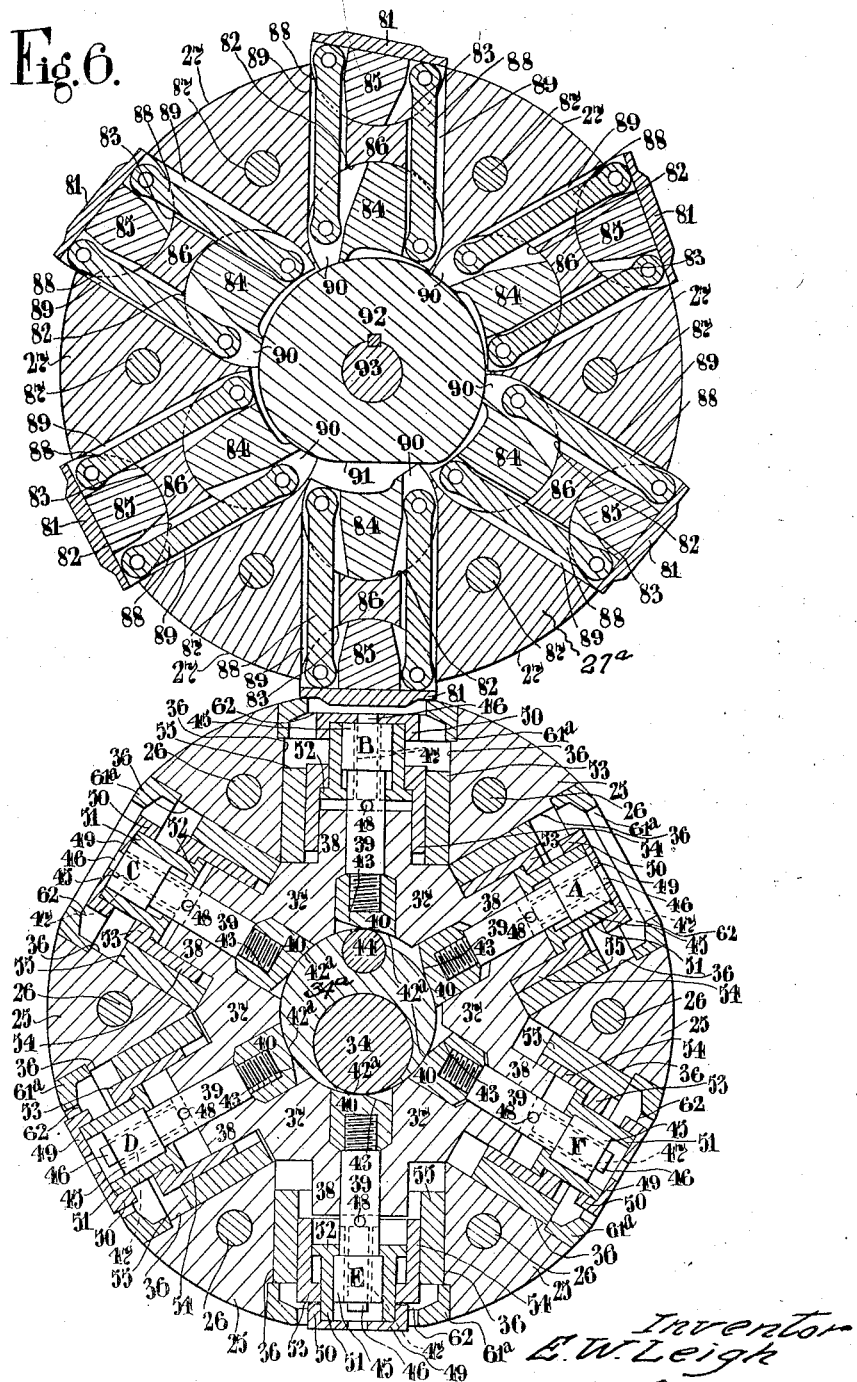

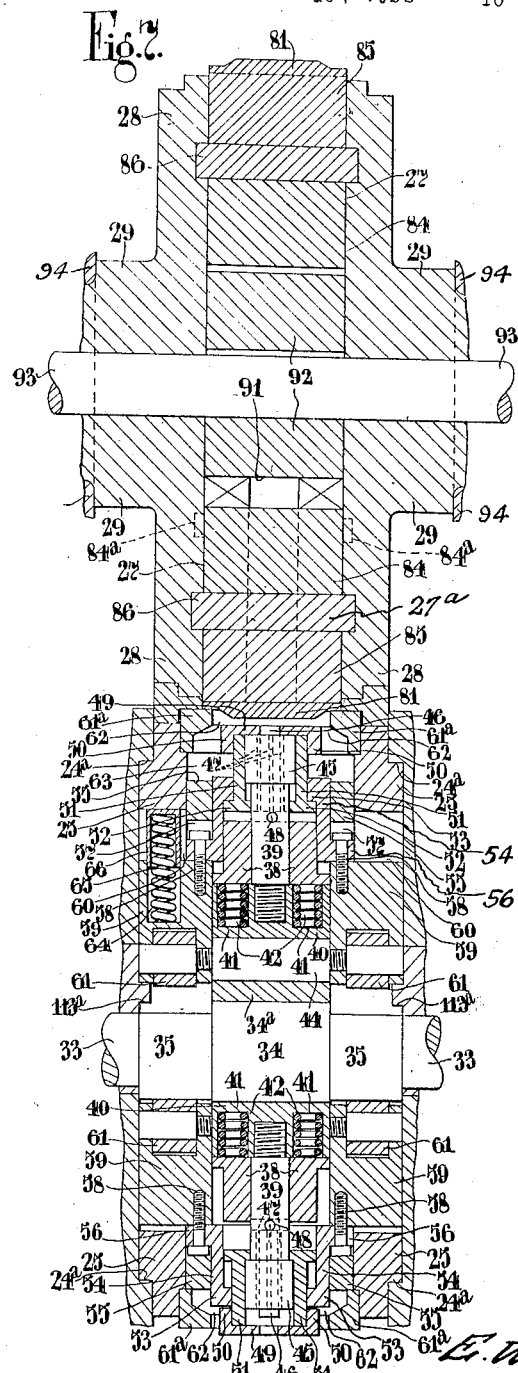

Aug. 12, 1924.　　　　　　　　　　　　　　　　　　1,505,042
E. W. LEIGH
PRESS FOR THE MANUFACTURE OF HOLLOW EARTHENWARE ARTICLES
Filed Nov. 10, 1922　　　10 Sheets-Sheet 9
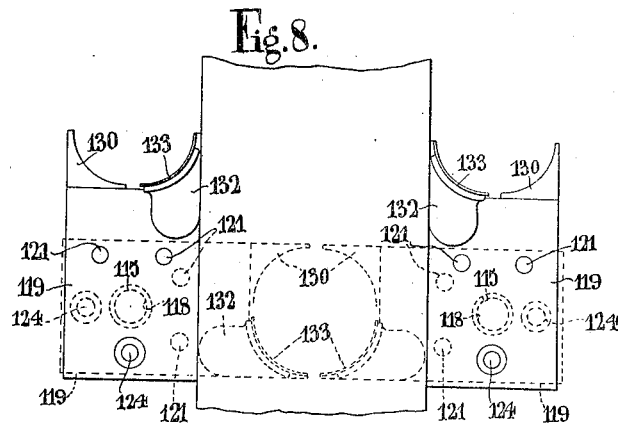
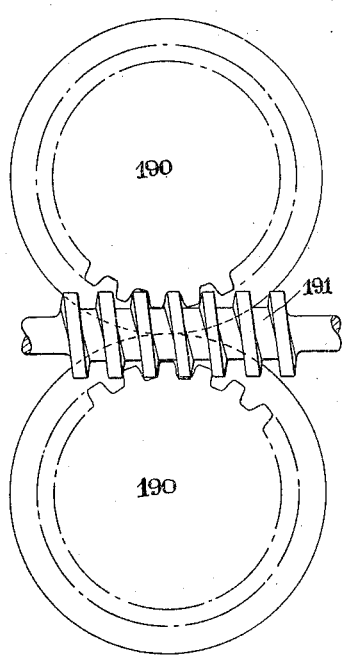
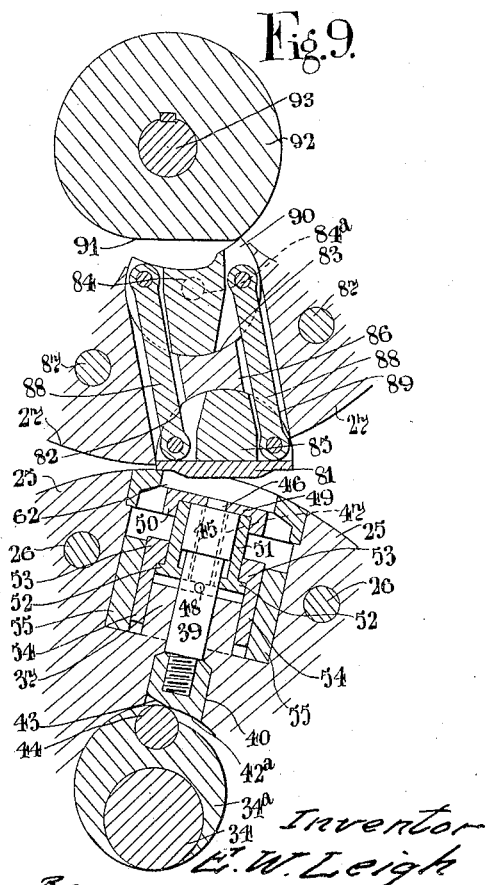
Inventor
E. W. Leigh Aug. 12, 1924.                                                                1,505,042
E. W. LEIGH
PRESS FOR THE MANUFACTURE OF HOLLOW EARTHENWARE ARTICLES
Filed Nov. 10, 1922        10 Sheets-Sheet 9
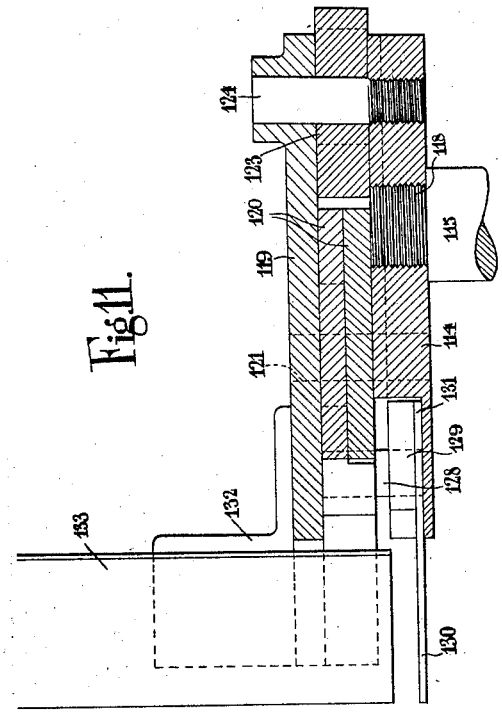
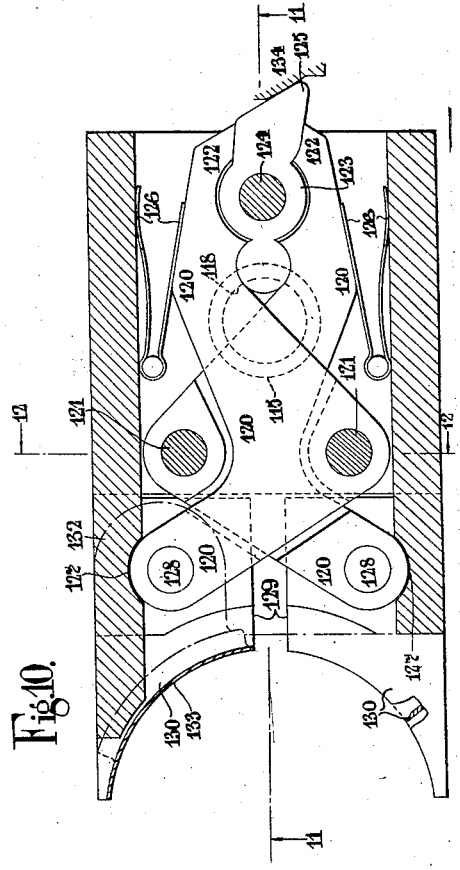
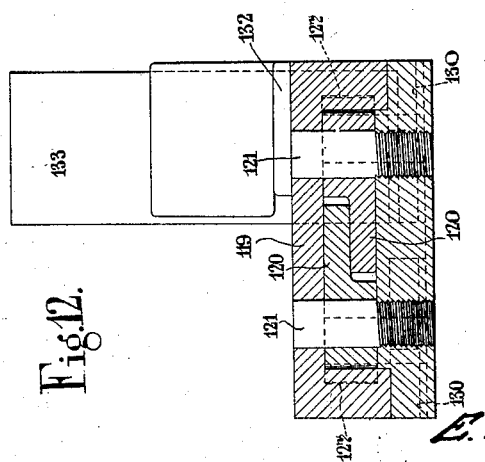
Inventor
E. W. Leigh
by Marks Clerk
Attys Aug. 12, 1924.  1,505,042
E. W. LEIGH
PRESS FOR THE MANUFACTURE OF HOLLOW EARTHENWARE ARTICLES
Filed Nov. 10, 1922  10 Sheets-Sheet 10
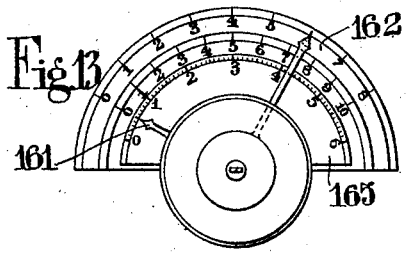
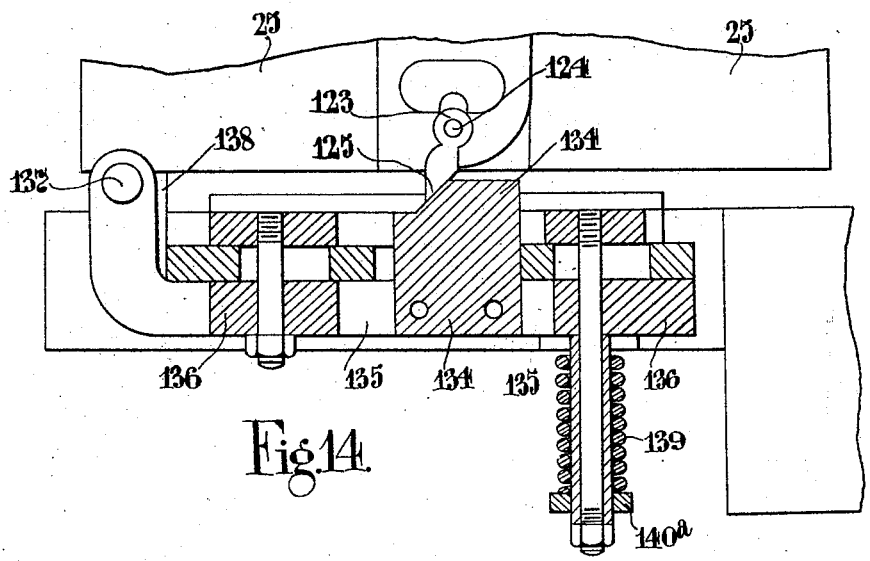

Patented Aug. 12, 1924.

1,505,042

UNITED STATES PATENT OFFICE.

EDMUND WILLIAM LEIGH, OF SHANKLIN, ISLE OF WIGHT, ENGLAND.

PRESS FOR THE MANUFACTURE OF HOLLOW EARTHENWARE ARTICLES.

Application filed November 10, 1922. Serial No. 600,165.

*To all whom it may concern:*

Be it known that I, EDMUND WILLIAM LEIGH, a subject of the King of Great Britain and Ireland, and residing at Fernside, Clarence Road, Shanklin, Isle of Wight, England, have invented certain new and useful Improvements in and Relating to Presses for the Manufacture of Hollow Earthenware Articles, of which the following is a specification.

This invention relates to the manufacture of earthenware articles, which are hollow in construction, such as jars for containing preserves or other products.

As hitherto constructed, the presses for producing these articles in numbers have usually comprised heavy reciprocating elements, and the production of articles over a given period of time is less than it might be.

It also involves a great expenditure of power to keep these heavy masses in motion, as well as to provide the necessary force to bring them to rest or to re-start them so that they may perform the functions required.

There is another drawback that the raw material which is supplied to these machines, usually refined clay, has to be supplied thereto in billets which obviously require to be previously cut off from a moving "string" of the material, and this again necessitates the use of a special cut-off mechanism. Moreover, the use of billets is undesirable in other respects, since they are often of varying plasticity, being relatively harder on the exterior than at the centre.

There is another disadvantage that in such machines there is a tendency for the articles produced to be rendered non-uniform in quality.

The principal object of the present invention is a form of improved power press for producing these hollow articles by a constant working uni-directional rotary press, the parts of which move continuously in one direction as distinguished from the usual form of reciprocating machine.

Another object of the invention is to so adapt the machine that the raw material is kept in continuous feeding movement, the machine in its operation regulating the successive charges of raw material that are to be utilized in manufacturing the particular articles required.

Another object of the invention is a form of cyclic press in which the articles are passed through a number of stages during a complete cycle, so that there are a number of articles in various stages of manufacture being produced.

Another object of the invention is the provision of means whereby absolute uniformity in the article being manufactured will be obtained, and if for instance even during the running of the machine, it is desired whilst manufacturing a jar of say six inches in length, to lengthen it or shorten it by half an inch for example, this is provided for by a simple adjustment in the machine.

A still further object of the invention is to enable the machine to run at such speeds that mass production of the articles desired is obtained.

The invention consists in a rotary press for the simultaneous stage by stage manufacture of hollow earthenware, in which each of a series of moulding cylinders on a continuously rotating carrier head successively assumes a position in which it is first filled with plastic material, at the next stage is subjected to pressure, and subsequently reaches a position where extrusion of the partly moulded article to form its circular wall commences, and a cradle is positioned to support the article whilst it is being extruded, after which the completely extruded article is cut off and dropped on to a travelling conveyor.

The invention also consists in a rotary press operating and constructed substantially as hereinafter described and claimed.

Figure 2:
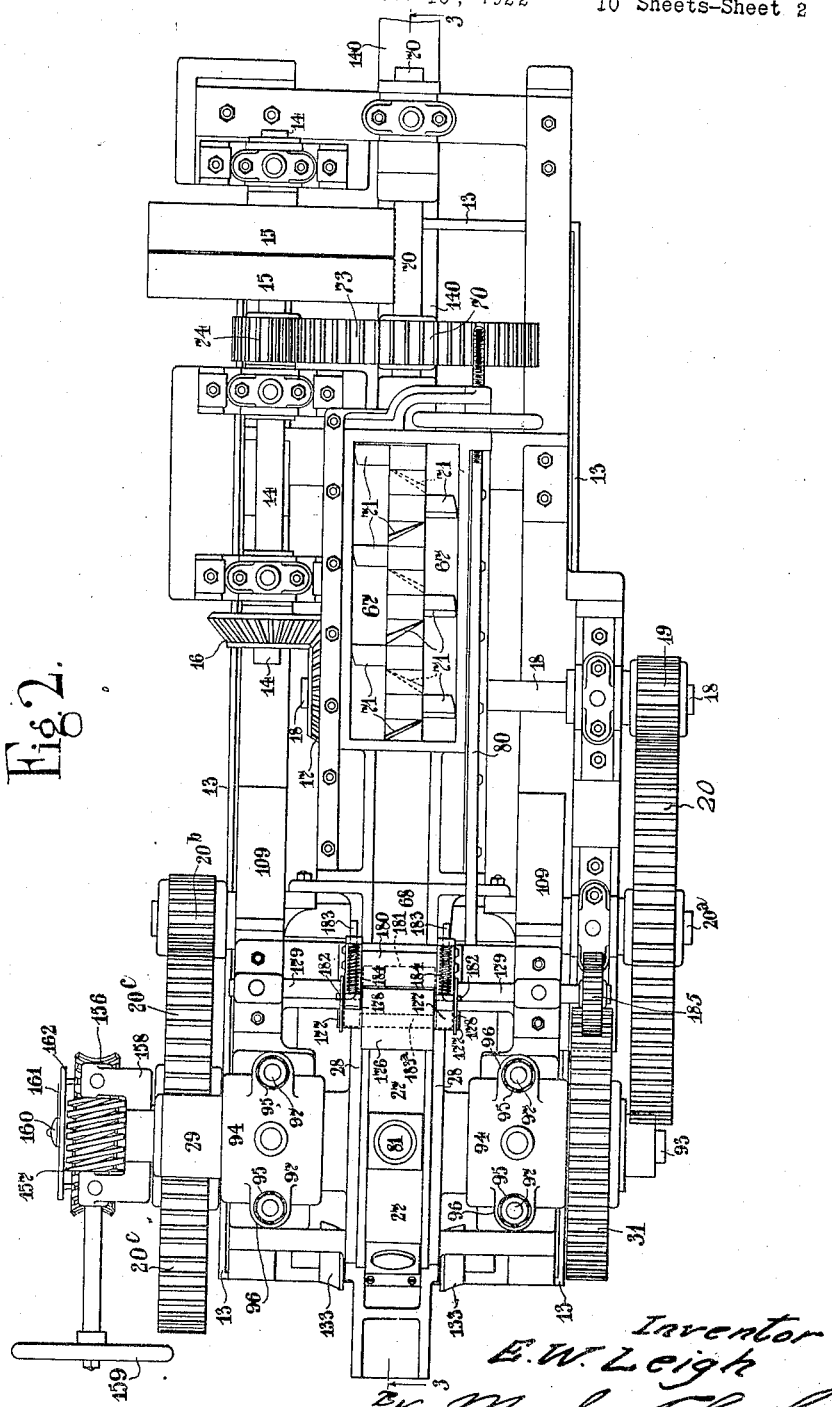
Figure 3:
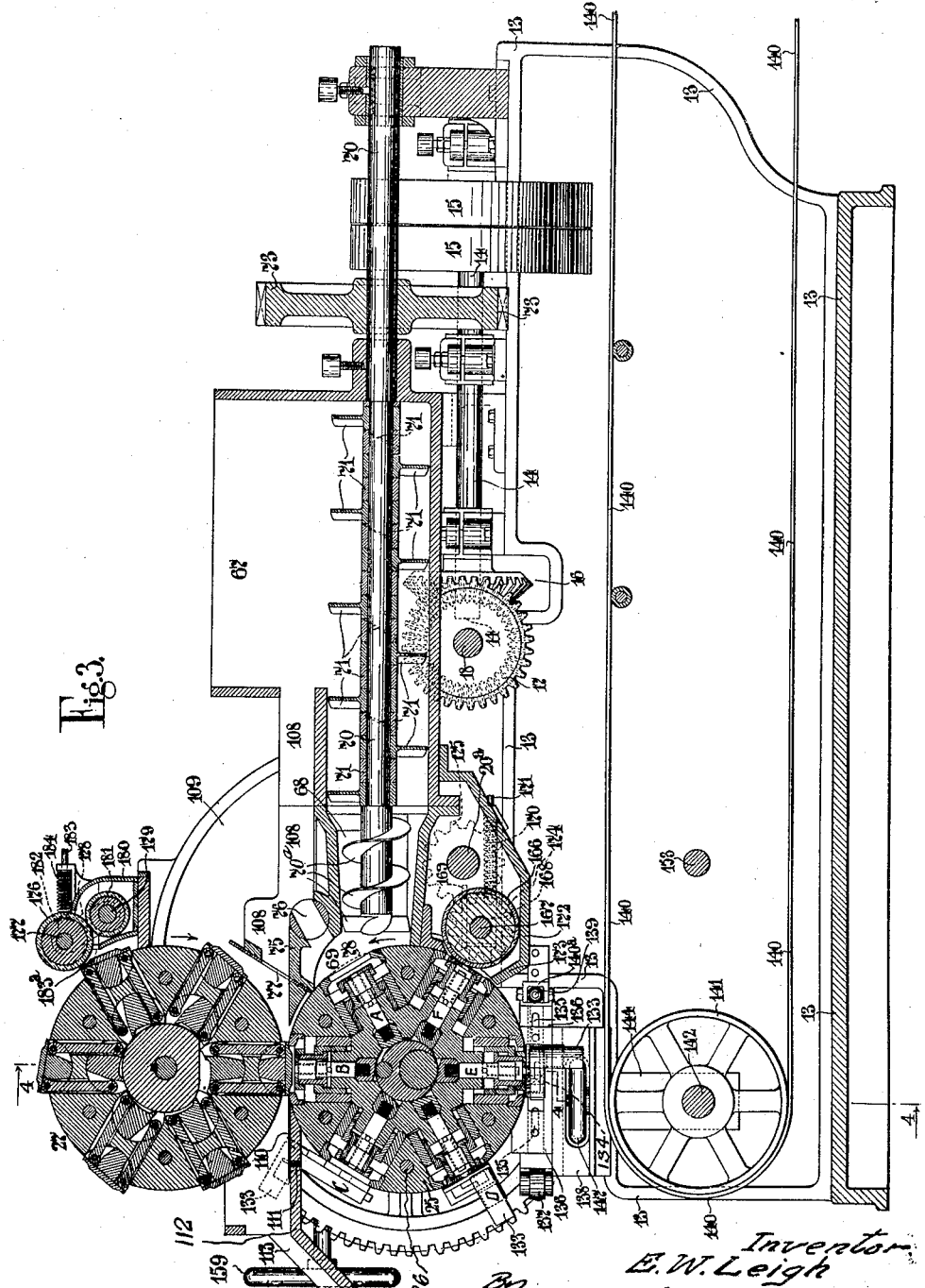
Figure 5:
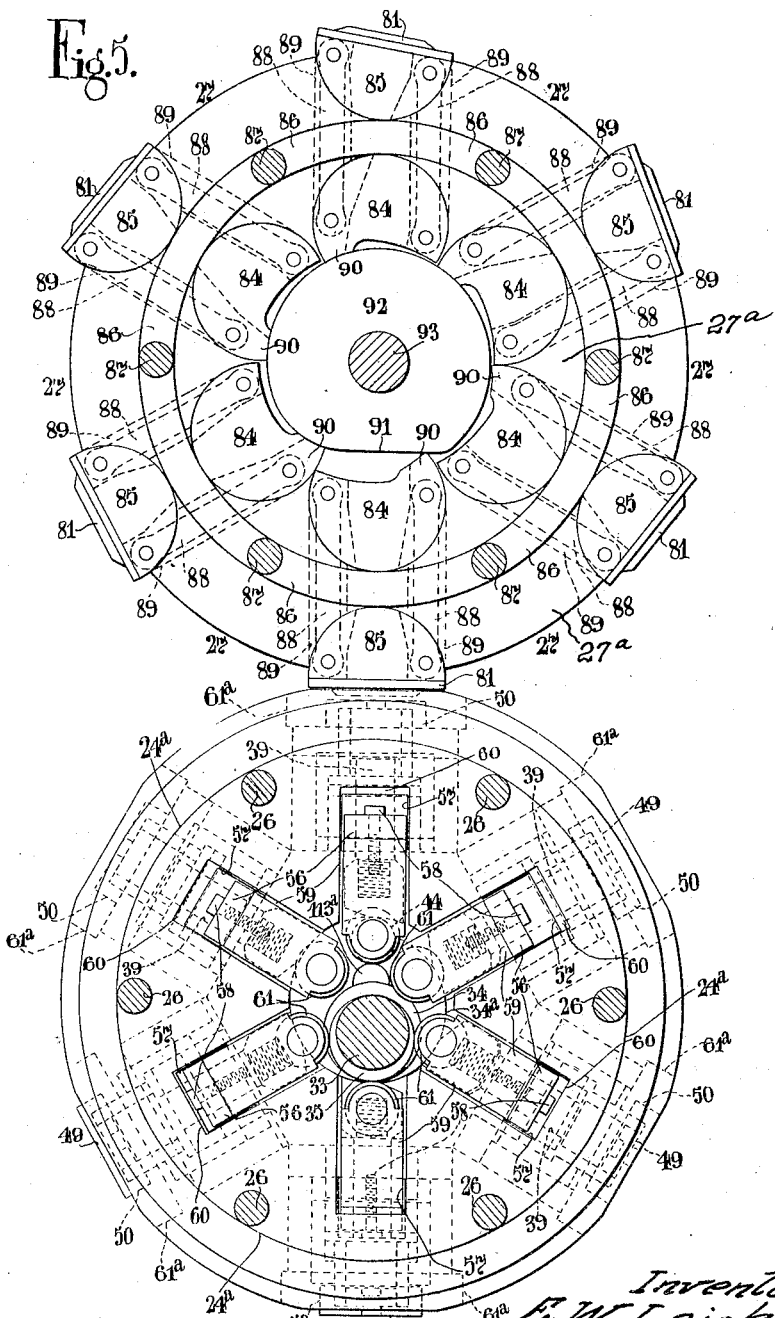

The invention will now be described with reference to the accompanying drawings, in which Figures 1 and 2 are respectively a general side elevation, and a plan view of one form of press constructed according to the present invention, Figure 3 is a sectional elevation of the machine taken on the line 3—3 of Figure 2, Figure 4 is another sectional elevation taken on the line 4—4 of Figure 3, Figure 5 is a sectional elevation of the parts drawn to a larger scale on a section through the machine as indicated by 5—5, Figure 4, Figures 6 and 7 are respectively enlarged views of the corresponding small scale parts in Figures 3 and 4, Figure 8 is a view of the cutting-off mechanism showing cradle and the two positions in the cycle of operations, Figure 9 shows the position of a pair of moulding members between two stages, Figure 10 is a view of the cutting-off mechanism with its cover plate removed, Figure 11 is a longitudinal section taken on the line 11—11, Figure 10, and Figure 12 is a transverse section on the line 12—12, Figure 10, Figure 13 is a side elevation of an indicator device, Figure 14 is a plan view of an adjustable yielding stop, and Figure 15 is a modification hereinafter referred to.

A brief general description of the machine will first of all be given by which the invention is carried into effect.

It comprises a circular carrier which is adapted to be supported upon a horizontal axle and to be rotated continuously at a suitable speed. It is carried upon trunnions or like supports, and opening on to its circumference are a number of circular or other desired shaped moulding cylinders that contain suitable moving pressure pistons or plungers to perform the desired moulding operations, and each of these moulding cylinders are successively brought into a first position which is opposite to a device into which is fed a constant supply of the raw material, usually refined plastic clay. The open end of each mould cylinder in turn receives from such feeding device a desired quantity of raw material, and the carrier in continuing its movement brings the charged cylinder into position opposite suitable devices for regulating such quantity of material.

It is then passed to the second position where the end surface of the material in the mould is subjected to high pressure for the purpose of properly moulding the bottom of the jar, and imparting density to the plastic material. It is then moved into the third position where a suitable device or cradle comes into position to support the lower half of the article, which is now commencing to be discharged from the mould. At the fourth position the extrusion of the article is proceeding, and in its further movement to a fifth position extrusion is completed and certain cutting devices are brought into proper working disposition with the extruded article, and cutters are operated in order to completely sever the finished article from the remainder of the mass in the moulding cylinder, and the complete article lightly drops or falls to the top stretch of a travelling conveyor by which the completed articles are successively removed from the machine.

The carrier above described is operated so as to turn or rotate in conjunction with an upper revolving member provided with a corresponding number of pressure devices and adapted to co-act with the carrier as will hereinafter be described.

A machine constructed in accordance with the invention, comprises in detail a suitable strong under-frame 13 mounted on the base shown and towards the back end of which is a driving shaft 14 supported on suitable bearings and fitted with the usual fast and loose pulleys 15. One end of the shaft 14 carries a toothed bevel wheel 16 which by means of a corresponding bevel wheel 17 drives a transverse shaft 18, that through a spur pinion 19 drives a large spur wheel 20, keyed upon a transverse shaft 20$^a$ extending to the other side of the machine, where it carries a toothed pinion 20$^b$ which is in gear with a spur wheel 20$^c$ keyed upon a trunnion sleeve 21 (Fig. 4). Such sleeve 21 is supported in a bearing provided therefor in one of a pair of uprights 22 carried by the under-frame 13, the other of such uprights supporting a similar trunnion sleeve 23. In between the two uprights, each of the trunnion sleeves 21, 23 ends in a heavy vertical flange or disc 24, these discs 24 being spaced apart and arranged to mutually face one another. A carrier body 25 is fitted in between the discs 24 which are socketed at 24$^a$ for that purpose, the three parts being bolted together by a series of transverse through bolts 26, six being shown for example in Figures 3 and 5. Thus the two trunnion sleeves, the discs and the intermediate carrier form a constant rotating system, which is designed to rotate in timed relation with a rotary pressure head 27 arranged above the carrier 25, and is of similar construction, being carried between a pair of discs 28 on the ends of trunnion sleeves 29 supported by the upright frame members 22. Keyed on the end of the trunnion sleeve 23 is a spur wheel 30, which is in engagement with a similar spur wheel 31 on the trunnion sleeve 29, and these being of equal size, the carrier and rotary pressure heads rotate at equal peripheral speeds.

Arranged within each of the trunnion sleeves 21, 23 is a tubular bushing 32 which is eccentrically bored to receive a shaft 33 that passes through both tubular members and transversely through the central carrier body 25, and both the shaft and the bushing remain stationary while the trunnion sleeves and the carrier body rotate round them. The shaft 33 carries at its centre portion where it passes through a centre opening in the carrier, a boss 34 (Figs. 6 and 7) superposed on which is a cam 34$^a$, and a cam 35 on each side of the cam 34$^a$, the three cams being arranged in a space equal to the width or thickness of the carrier body, the tubular members 32 abutting on the outer cheeks of the cams 35. The shaft 33 with its boss 34 may be rotated within the cam 34ª to effect adjustment, as hereinafter explained.

The carrier body is fitted with a series of radially arranged cylinders and plungers which form moulding and extrusion devices, six of such devices being shown in the present example. They are all of similar construction, the six cylinders being constituted by six radial borings 36 (Fig. 6) in the carrier body 25, which borings extend inward towards the centre for such a distance as will leave a strong core 37 at the centre where there is an opening in which the boss 34 of the shaft 33, the cam 34ª and the two cams 35 are disposed. The arrangement of one of the cylinders and its associated plungers is as follows:—

Projecting up from the bottom of one of the borings 36 there is a boss 38 through a hole in which there is extended a short stem or piston rod 39, the lower end of which is secured, as by screw threading, to a block 40 which is of rectangular shape and slides radially within a correspondingly shaped recess in the core 37, and which opens at one end into the central opening in the core. It will be seen from the cross sectional view, Figure 4, and the enlarged details, Figures 6 and 7, that the block 40 is in length greater than its width, the length corresponding to that of the cam 34ª, and has a pocket 41 at each side of the screw threaded stem 39 containing a coiled compression spring 42 as hereinafter explained. The inner end of the block 40 has a slightly recessed face 42ª adapted to ride upon the periphery of the cam 34ª and an off-set portion 43. One half of the periphery of the cam 34ª is of constant radius whilst the radius of the other half constantly decreases till it presents a step at its upper part, Figure 3, such step being filled or occupied by an anti-friction roller 44, whereby as the off-set 43 approaches the top of the cam 34ª an outward radial movement of the block 40 is effected with facility. The outer end of the stem 39 ends in a piston head 45 surmounted by a centre stud or boss 46. A series of air ports 47 are longitudinally arranged within the upper part of the stem 39, one end of such ports having side openings 48 on the stem positioned just above the centre boss 38 and their other ends opening on the outer face of the piston 45 around the stud 46. Fitting upon the stud 46 there is a cap 49 that fits upon the outer face of the piston normally closing the air ports 47 and that carries a depending flange 50, the interior of which is larger than the diameter of the piston, so as to provide an annular space within which there is fitted, as by screwing if necessary, one end of a sleeve 51 of somewhat greater length than the piston, the other end of the sleeve being internally and externally flanged as at 52 to respectively fit the stem 39 in one case, and in the other case, to fit under the overhanging flange 53 of an annular plunger 54 concentric with the sleeve 51 and piston stem 39. Surrounding the annular plunger 54 is another annular plunger 55 which is a working fit in the boring 36 of the carrier body 25. At its lower end, the plunger 54 at diametrically opposite points carries lateral extensions 56, see the detail Figure 7, that are arranged to project into and through corresponding slots 57 formed at opposite points in the plunger 55. Each extension 56 is attached as by screw bolts 58 to a pair of blocks 59 upon which rests the plunger 55. The blocks 59 project from the extensions 56 of the plunger 54 on opposite sides, and are accommodated in slots 60 formed in each side of the carrier body 25, and their lower ends are forked to each carry a roller 61 which is arranged to contact with the cams 35. The mouth of the boring 36, is closed by a ring 61ª which may be screwed into position, and its internal diameter is such that with the cap 49 on the piston 45, an annular space 62 is left which will correspond with the thickness of the sides of the jar to be moulded. As shown in Figure 7, this annular space opens downward or radially inwards into a larger space 63 which is immediately above the plungers 54, 55 and contains the charge of clay or earthenware from which the jar or other container is to be moulded.

The ring 61ª and the cap 49 are replaceable by similar parts of different dimensions and shape so that changes in shape and thickness of the manufactured article may be effected. If desired the internal periphery of the opening in the ring 61ª may be scored or grooved in a direction parallel to the axis of the parts so that the exterior of the jar will be ribbed or scored as is sometimes usual.

To assist the parts in returning to normal position after being actuated by the cams 35, the block 59 may be fitted with two pockets 64, one of which is shown in Figure 7, to receive one end of a compression spring 65, over the other end of which a nipple 66 may be fitted, the whole arrangement being disposed in slots similar to those indicated at 60, and the nipple abutting against the carrier body 25.

As the carrier body rotates, each cylinder 36 is brought to the position A (Fig. 6) where it receives a charge of refined clay or earthenware from a hopper 67 (Fig. 3) fitted with a discharge outlet 68 of convergent form that opens into a sector-shaped chamber 69 which is open to the periphery of the carrier body. Arranged in the lower part of the hopper 67 is a conveyor shaft 70 having a number of conveyor knives 71 thereon to keep cutting up the clay and pressing it forward to the discharge outlet 68 where as it enters the feeding chamber 69 it is finally pressed forward by blades 72 carried on the end of the conveyor shaft 70, a worm conveyor 70a being arranged behind the blades. The opposite end of the propeller shaft is carried in suitable bearings as shown, and is constantly driven by the spur wheel 73 which is in driving engagement with pinion 74 on the main driving shaft 14. As the clay is being constantly fed, and as the carrier body is always rotating, the feeding chamber 69 is of such peripheral extent that as one filled cylinder is leaving the chamber, the next cylinder has already commenced being filled. The clay is thus in constant forward movement, and there is no extra work thrown on to the machine due to the clay being temporarily stopped after the filling of a cylinder and before the arrival of the next, as sometimes happens in such feeding systems.

The top part 75 of the feeding chamber 69 extends into the "bite" between the carrier body and the rotary pressure head 27, and it is fitted with a valve member 76, and a scraper knife 77 to smooth the charge of clay in each cylinder as it leaves the feeding chamber, the clay being left with a curved profile as shown by dotted line at 78, Figure 3, this representing a definite excess amount of clay which will be utilized at the next stage B. The feeding of material into the chamber 69 is such that it will always at least be full, and should it be excessive, the valve 76 may be adjusted by the crank arm 79 (Fig. 1) when actuated by the screwed rod 80 on the exterior of the machine. In this way should it be desired to vary the size of jar being made, the valve 76 may be opened or closed so that the cylinders take less clay or more as the case may be.

After the charged cylinder has left the stage A, it reaches stage B, where the clay is submitted to considerable pressure from the rotary pressure head 27. This as previously explained, rotates at the same speed as the carrier body, and it carries the same number of pressure members 81 as there are cylinders, and each pressure member will successively come into alignment after the manner of a toggle lever with its corresponding cylinder, in synchronism with the moment of highest pressure.

The rotary pressure head 27 (Figs. 5 and 6) comprises a strong heavy disc 27a, with an opening in the centre, and both the internal and the external periphery are each formed with six semi-circular seatings 82, 83 respectively, and arranged in pairs. In these seatings are mounted correspondingly shaped oscillating members 84, 85, of which 84 comprises the inner, and 85 the outer set. Projecting from each side of the disc 27a is a flange or circular rib 86, each of which snugly fits into a corresponding circular recess in the opposed faces of the discs 28 attached to the trunnion sleeves 29 (see Figs. 5 and 7), the parts being securely bolted together by transverse through bolts 87. The outer oscillating member 85 of each pair is linked to its inner member 84 by rods 88 which pass through suitable clearance holes 89 in both of the semi-circular seatings and the whole arrangement forms a pressure unit. Both of the oscillating members are rectangular in cross section, and all of the outer members are surmounted by the pressure cap or member 81. The inner side of the cap 81 is flat, whilst its outer face is thicker at its centre part, than at the edges, in order that it may serve as a mould for the recessed bottom surface of the jar to be moulded. The inner set of oscillating members 84 each have a seating which somewhat exceeds a half circle and the remaining or inwardly facing surface is formed with a projecting nose piece 90 which is adapted to co-act with a cam surface 91 formed on a body part 92 arranged within the centre opening of the head or disc 27. Such body part 92 is keyed to a shaft 93 which passes longitudinally through both trunnion sleeves 29 and extends clear beyond the ends thereof as shown in Figure 4. The trunnion sleeves 29 are supported in bearings 94, the upper bearing cap of each of which is under the control of a spring yoke, consisting of a pair of springs 95 that abut against lugs 96 on the upper bearing cap and against collars 96a carried on the upper end of a pair of yoke rods 97, from whose lower ends is suspended the lower bearing cap of the bearing 98 carrying one of the trunnion sleeves 21 or 23 which support the carrier body 25. The free ends of the shafts 93 and 33 are adapted to be linked together by bars 99, the upper and lower ends of which have rings or eyes 100 and 101 respectively fitting over the respective shaft ends and held from moving laterally by nuts 102 or other devices. Whilst the ring 101 is a working fit on its shaft the upper ring 100 is made larger so as to allow for movements of the shaft bodily upwards should excessive pressures occur between the carrier body and rotary pressure head. Keyed upon the shaft 93 is an eccentric ring 103, arranged within the eye 100, sufficient play being left above the ring 103 and the upper part of the eye 100 to allow the bearing to yield.

It is to be noted that within the trunnion sleeve 23, there is a tubular bushing 32, and eccentrically within such bushing is arranged the shaft 33. As the shaft carries a number of cams, the correct relative position of the parts is maintained by their relative eccentricity, but in order to quickly position the tubular members when assembling the parts and prevent any possibility of the tubular member changing its position, they are each provided with a tapped bored hole 105, into which may be screwed a bolt 106 passing through the bar 99 and a small pillow block 107 of crescent form fitting upon the ring 101, see Figures 1 and 4. With such an arrangement, the shaft 93 is definitely linked to the shaft 33, the distance between them being constantly maintained while the load remains normal; but should the load be temporarily increased, the spring bearings will yield and the shaft 93 is free to rise slightly within the ring 100 of the bar 99 due to the space provided above the keyed block 103. The links also serve to prevent any rotation of the lower trunnion tubular bushings 32.

The carrier body and the rotary pressure head constantly rotate in the direction of the arrows, Figure 3, and as each pressure unit of the head 27 approaches the position in which it is in alignment with its corresponding cylinder and plungers in the carrier body, the pressure cap 81 has already assumed a tangential position with its leading portion only very slightly projecting beyond the periphery of the head 27, whilst its trailing or rear portion projects in a much greater degree, this being due to the action of the nose 90 on the trailing end of the oscillating member 84 in riding upon the cylindrical surface of the cam body 92, which throws the leading end of the oscillating member inwards. The action of the cylindrical part of cam 92 therefore "sets" the oscillating member 84 and this setting movement is transmitted to the complemental oscillating member 85 through the links 88.

As the pressure cap 81 approaches the carrier body, see Figure 9, its leading edge and the shoulder of the thickened centre part, come into contact therewith, which causes these parts to slightly recede, this being allowed for since the corresponding leading portion of the oscillating member 84 has now entered upon the cut-away portion 91 of the cam body 92. These parts receding inwards cause the trailing part of the oscillating body 85 to further project, causing it to become parallel with the plane of the mouth of the corresponding cylinder 36 and closing upon it before the two have reached their mutual aligning position. Further rotation brings the nose 90 under the cut away part 91 of the cam body 92 and the pressure on the leading edge of the cap 81, will force the cam to follow along the cut away part 91, this resulting in a progressive adjustment of the pressure cap 81 to maintain its being kept tightly closed on the mouth of the cylinder. By the time that the dead aligning position is reached, the piston stem 39 has been forced radially outward by the action of the cams 34ª and the clay in the cylinder is thus put under high compression to ensure proper density and at the same time to mould the recessed bottom of the jar, but should any foreign substance be embedded in the clay creating super-pressure, the rotary pressure head will yield by the spring bearings above described. A steel pin 84ª may be provided on each of the inner oscillating members, and suitable clearance space provided in the curved seatings, see Figures 7 and 9.

As the parts continue to rotate, the moulding pressure is maintained for a short period after the aligning position is broken, the closure of the mould lasting until the cam nose 90 and the link 88 on the same side reach approximately the centre line between the two rotating heads, after which the pressure will gradually cease. As soon as the cam nose 90 has passed the surface 91 of the cam body 92, the nose and the corresponding link 88 are adjusted outward to move the pressure cap 81 into its former tangential position, and it retains this position until it comes round to perform another moulding operation, but if desired a more convenient position may be given to the pressure cap when opposite the burnishing and lubricating rollers, and afterwards said pressure cap may be set back to the position shown. All of the six pressure units are of similar construction and successively operate in the same way.

It is to be noted that as a pressure cap 81 closes on its mould, the leading edges first come into contact, the parts resembling a pair of V-shaped jaws, see Figure 9, which gradually close together, so as to thereby permit any excess clay to spew backwards where it will be caught upon the sharp end of the overhanging upper part 75 of the sector-shaped chamber 69 and returned to the hopper 67 by the channel 108, the scraper bar 77 being perforated for this purpose.

As the cylinder 36 with its compressed charge leaves the position or stage B, the outer surface of the moulded article is "trued" by a spring knife 110 held down by one end at 111 upon a fixed tray 112 that is fitted with a chute 113 which serves to carry away the clay cut off by the knife.

Referring to the cams 34ª, 35 as each moulding cylinder moves into the position A, the concentric plungers 54, 55 have receded and the stem 39, its piston 45, sleeve 51 and the cap 49 are also in their innermost position owing to the parts moving over the recessed portion of the cam 34ª. As the leading part of the ring 61ª moves past the bottom of the hopper discharge 68, clay immediately begins to pass into the cylinder and the entering clay may be the means to cause the piston and plunger parts to recede, but if desired, the springs 42 and 65 may allow for this movement. The cylinder as it passes in front of the hopper is thus progressively filled and passes beneath the scraper knife 77, after which it moves into position B, the cam 34ª having actuated the piston cap 49 and its associated parts, to secure full compression on the clay against the aligned pressure unit of the rotary pressure head. It is to be noted that as the block 40 is actuated by the cam 34ª the flange 52 on the sleeve 51 also draws forward the plunger 54, but no movement has been given to the plunger 55, as the extension 56 on the plunger 54 has not moved the extent of the slots 57 in the plunger 55, but by means of the bolts 58, the blocks 59 carrying the rollers 61 have also been drawn outward, compressing the springs 65 and 42. It is to be noted that the slots 57 extend down to the top of 59. In this full pressure position the plunger 54 is unsupported, because in this position the rollers are not in contact with their cams 35. To form a support it is preferred that the end of each trunnion-sleeve 32 be shouldered as at 113ª, Figures 4 and 5, and such shoulder portion engages the lower edge of one side of the forks supporting the rollers 61, as they assume the position B, each shoulder being of a depth sufficient to take the stress.

After leaving the position B, the stem 39 and piston 45 are maintained in their outward positions as the foot 42ª of the block 40, in riding on the higher cylindrical part of the cam 34ª, passes through the position C and reaches the stage D, the position of the inner piston 45 having remained unchanged. At this stage the rollers 61, as will be seen in Figure 5, have been brought into contact with their cams 35, and the plunger 54 has been urged outwards. By the mass of moulded clay acting on the underside of the flange 50 of the cap 49, the sleeve 51 is moved relatively to the inner piston 45 withdrawing from the stud 46 leaving its corresponding opening in the cap 49 free and uncovering the air ports 47 to admit atmospheric pressure beneath the moulded bottom of the jar. The piston cap 49 in this position projects slightly beyond the ring 61ª forming the outlet to the cylinder so that a ring of clay occupying the annular space 62 connects the bottom of the jar to the mass which is still within the cylinder, such ring of clay being the commencement of the circular side wall of the jar. By causing the plunger 54 to move simultaneously with the piston cap 49, there is no danger of tearing the jar bottom away from the mass of clay, as the quantity necessary to fill the space 62 is made up by the clay which is displaced by the plunger 54.

As the rotation from D to E takes place, the plunger 54 is still being urged forward by its cam rollers 61, but leaves the piston cap 49 behind, as the flange 52 on the sleeve 51 catches behind the shoulder formed by the rear of the inner piston 45. Pure extrusion thus commences and the moulded jar bottom leaves the piston cap 49. There is no danger of the bottom "caving in" as the air ports 47 have been opened so that the pressure is balanced on both sides of the jar bottom. It will be understood that sufficient air can reach the radial air ports 48 as the interior parts of the carrier body are such as will afford the passage of air, by the ports 48ª (Fig. 4) shown in dotted lines.

As the plunger 54 continues to move, the rearward extensions 56 "pick up" and also carry along with them, the plunger 55 until when the position E is reached, sufficient clay has been extruded to complete the wall of the jar.

In order to support the jar whilst it is being extruded, a cradle is brought into position on the carrier body soon after leaving the position C. This is constructed as follows:—

Mounted on each of the discs 24, between which is arranged the carrier body 25, is a series of six base plates 114, arranged in pairs to correspond to each moulding cylinder. The base plates are carried on pivotal pins 115 which pass radially inward through the heavy flange 116 of the discs 24. The inner end of each pivotal pin, screwthreaded and held in position by nuts as shown in Figure 4, is fitted with a spiral spring 117 having the inner end secured to the pin and the outer end anchored to the adjacent surface of the disc 24. The outer end of each pin is preferably screwthreaded into the base plate as shown at 118 in the detail views, Figures 10 to 12. Fitted on to the base is a cover plate 119 having sides so as to form a box-like structure with open ends, the whole forming a housing for a pair of cross-levers 120, fulcrumed on pins 121 screwed or otherwise fixed in the base plate 114. The tail ends 122 of the cross levers contact with opposite sides of a trip actuating lever 123 fulcrumed on a fixed pin 124. As shown in Figure 10 the rear end of the actuating lever 123 has a trip nose 125 which when actuated as will be described expands or presses apart the tail ends 122 against the force of leaf or other springs 126 mounted in the housing. The free ends of the cross levers which are adapted to normally engage recesses 127 in the side walls of the housing carry projecting pins 128 which are secured to the rearward extensions 129 of a pair of segmental cutter members 130. Each cutter member embraces approximately a quarter of a circle and the base plate 114 is recessed at its forward end at 131 to accommodate the extensions 129. The cover plate 119 carries at its forward end by means of a bracket 132 a quadrant shaped plate or holder 133 which at one end is in close proximity to the quadrant-shaped cutter 130 and coincides in position therewith, and is of a length approximating to that of a jar.

As shown in Figure 8 when a pair of the above described housings are mounted by their pivotal pins 115 on the flanges 116 and in mutual alignment with the centre of a moulding cylinder, the normal tendency of the spiral springs 117, will swing each housing transversely inward to the dotted line position, so that the two quadrant holders 133 (which are right- and left-handed) will position themselves about the lower half of the moulding cylinder as shown at the stage D, Figure 3, to receive and support the jar as it is being extruded, the cutters 130 at the same time positioning themselves all round the jar. By the time the stage E is reached, the extrusion of the jar will have been completed and the jar will be hanging from the moulding cylinder. At this moment the tripping noses 125 of the pair of cradle housings are brought into contact with a pair of fixed stops 134, one of which is seen in Figure 10, and partially rotates each trip actuating lever 123 on its pivot 124, moving the corresponding pair of quadrant cutters 130 inwards and radially through the clay ring by which the jar remains suspended. In order, however, to impart to the cutter a slicing action, the movement given to the trip is such that it exceeds that which is necessary to bring together the adjacent sides of the extensions 129 of the cutters 130. This excess of movement results in pushing both cutters together bodily forward so that the cutters receive a short slicing movement, the cutter pins 128 sliding forward in the recessed part 131 of the base plate 114.

Each of the stops 134, as shown in Figure 3 and in the detail view Figure 14, is adjustably carried in slots 135 formed in a plate 136, which is carried at one end on a pivot 137 supported by a bracket 138 forming part of the main frame of the machine. The other end of the plate 136 is under the tension of a spring 139 which is anchored to a fixed bracket 140$^a$, see Figure 14. In this way both of the stops 134 are yieldingly mounted to receive the impact of the trip noses 125 that actuates the cutters.

When the moulded jar is finally cut off, it drops down upon the upper stretch of a band conveyor 140 passing round and driven by a belt pulley 141 carried loosely on a fixed shaft 142 transversely arranged beneath the carrier head 25 and its associated parts. Only one end of the conveyor is shown, and the pulley 141 therefor is supported in bearings 143 (see Figure 4), that are adjustable vertically in slots 144 provided in the lower end of the under frame uprights 13. For this purpose each of the bearings 143 is adapted to receive a non-rotatable nut 145 internally tapped to engage with an adjusting screw 146 having an operating hand wheel 147 which is carried by the fixed and slotted frame shoulder 148. The screw 146 is longitudinally immovable, and when rotated moves the nut 145 and therewith the bearing 143 up or down. The shaft 142 is non-rotary and is transversely bored at 149 to accommodate the end of the screw 146. The conveyor driving pulley 141 is fixed to a sleeve 150 on which is keyed a sprocket wheel 151, which is chain-driven from a sprocket 152 carried on a shaft 153. This latter shaft is in turn driven by sprocket wheel 154 which is chain-driven from a sprocket pinion 155 on the shaft 20$^a$. The drive described is a reducing gear train which drives the conveyor 140 at the speed necessary to take away each moulded jar as it is deposited thereon, and the top stretch thereof is supported by the rollers shown. The chain-drive also permits the raising or lowering of the pulley shaft 142 to correspond with the length of jar being produced, which, as will be described, may be varied and whatever length is adopted the conveyor should be brought as close as possible to the carrier head to lessen the drop as much as possible.

In order that the length or height of the jar being moulded may be changed, means are provided to vary the moment at which extrusion commences. The shaft 33 carrying the extrusion cams 35 is adapted to be independently adjusted by a worm wheel 156 at one end (Figure 4) that may be turned by a worm 157, whereby the cams 35 will be advanced or retarded so that extrusion will be varied accordingly, the cam 34$^a$ remaining unchanged. The worm is supported in a bearing 158 and is operated from the front of the machine by a hand-wheel 159. In Fig. 5 the cam 35 is shown in the position which gives the longest stroke to the plungers 54, and consequently the machine then makes jars of the greatest length. In order to adapt the machine to make jars of shorter length, the shaft 33 is turned through any angle up to 180° in a clockwise direction from the position shown in Fig. 5. To form an indicator as to the amount of adjustment the shaft 33 carriers by means of a washer and screw 160, an index 161$^a$ (see Figs. 4 and 13) which co-operates with a graduated scale 162 supported immovably by a disc 163 forming part of a bracket depending from the boss on the end of the adjacent link member 99. The dial 162 shown in Fig. 13 contains two scales, for indicating the length of the jar, each scale corresponding to a particular diameter and thickness of jar, that is each scale corresponds to a certain size of ring 61ª, used in conjunction with a certain size of cap 49. The graduations of the scales in this Figure 13 are diagrammatic only. An arrow head or similar mark may be provided to slide along the index 161ª so as to indicate what scale of the graduated dial 162 is to be used.

Combined with the extrusion indicator there is a pointer 161 movable over a fixed graduated plate 165, which may be used to indicate what wear, if any, has occurred in the parts. When it is shown by the articles being made that wear has occurred, the pointer 161 should be set to indicate this wear. Then when it is required to set the machine to produce articles of a certain definite length, the extrusion cam should be adjusted so that the pointer 161ª indicates (on the corresponding scale of the dial 162) a length in advance of the actual length required by the amount indicated by the pointer 161, to allow for wear.

After each moulding cylinder leaves the position E, the block 40 on the piston stem 39 commences to travel on the eccentric portion of the cam 34ª, so that it is allowed to gradually recede. When it reaches the position F, in order that the open end of the cylinder and the piston cap 49 may be kept bright and oiled, they move past a burnishing lubricating roller 166 which rotates oppositely to the direction of movement of the carrier head. For this purpose the roller 166 covered preferably with a layer of combined textile fabric and rubber, is carried on a spindle 167 supported in a bearing member 168 which is slidable in guides 169 under the influence of a spring 170 coiled upon a guide pin 171 as shown. This allows the burnishing member to maintain contact with the alternate flat and circular parts of the carrier head. The wheel and its parts are mounted in a trough 172, preferably carried by the hopper 67, containing a suitable quantity of lubricant up to about the level of the front lip 173 of the trough. To drive the shaft 167 it carries a toothed pinion 174 which is in driving engagement with a spur wheel 175 on the shaft 20ª. This toothed gearing is such that the yielding of the burnishing wheel is allowed for without interrupting the drive.

Similarly, the pressure plates 81 on the rotary pressure head are kept polished and oiled by a roller 176 on a shaft 177 supported by a frame 178 adapted to pivot about a spindle 179 which is arranged in a fixed trough 180. The lubricant contained in such trough is transmitted to the roller 176 by a doctor roller 181, while to afford a yielding movement to the roller 176 the frame 178 has a lug 182 to which is pivoted a rod 183, which by means of a spring 184 coiled around it keeps the roller 176 constantly pressed against the successive pressure plates 81, a stop 183ª being provided for the frame 178. The spindle 179 is supported in suitable bearings in the sides of the trough 180 mounted on a fixed part 109 of the framework, and one of its projecting ends carriers a toothed pinion 185, Figure 2, adapted to be driven by the spur wheel 31 which serves to drive the rotary pressure head.

As each moulding cylinder moves from the position E to F, the quadrant plates 133 forming the cradle come into contact with the lip 173 of the trough 172, which swings them away from one another, turning the housing on which they are carried through 90° on their pivot pins 115 and stressing the spiral springs 117. The housing in its longitudinal direction is now tangential to the periphery of the carrier and maintains this position by the quadrant plates 133 sliding against the outer sides of the feeding chamber 69 and tray 112, till they reach the position C (Figure 3) where as they pass the tray 112, they are caused by the springs 117 (Fig. 4) to come together again in readiness for the next extrusion.

After leaving the position F, the moulding cylinder arrives at A, where it commences another cycle. It is to be noted that during this stage the rollers 61 on the plunger 54 leave their cams 35, causing the piston cap 49 and sleeve 51 to close upon the inner piston and cutting off the air ports 47, so that by the time position A is reached all the parts within the cylinder have receded to receive a new charge of clay.

From the foregoing it will be understood that a rotary press having a definite cycle of operations is obtained and which is of very strong construction. While the rotational movement is relatively slow, a constant series of stage by stage movements are simultaneously producing a number of moulded articles at successive stages in its operation. The means by which the greatest pressure is applied to moulding the jar bottom is obtained by a strong toggle-like pressing action whereby the bottom is thoroughly homogeneous, and, moreover, as the extruding pressure continues the sides will be homogeneous; at the same time, however, any breakage of the machine is prevented should the pressure be higher than that intended.

The various parts which comprise the press may be adapted in various ways to suit the circumstances of usage or the particular style or shape of jar or similar container that is to be produced. For example, instead of using the reducing gear train described, the carrier head and the rotary pressure head, as shown in Figure 15, may each be fitted with a worm wheel 190 arranged between and driving which is a worm 191.

Having now described my invention, what I claim as new and desire to secure by Letters Patent is:—

1. A rotary press for the simultaneous stage by stage manufacture of hollow earthenware articles, comprising a rotary carrier-head, a series of moulding cylinders in said head, a hopper for successively filling each of said moulding cylinders with plastic material, means for subsequently compressing said plastic material within the moulding cylinder to partly mould the article so as to form a base connected to a thick annular wall both of plastic material, means whereby said thick annular wall of plastic material is after that subjected to extrusion to form the relatively thin annular wall of the hollow earthenware article, a cradle for supporting the article while it is being extruded and a travelling conveyor to successively receive and remove the completed articles.

2. In a rotary press as claimed in claim 1, the combination with a series of radial moulding cylinders, of a plurality of plungers in each one of said moulding cylinders, a stationary shaft at the centre of the carrier head, and cam-like elements mounted on said shaft for causing the plungers in each cylinder to be moved outwardly in proper succession.

3. A rotary press as claimed in claim 1, comprising a pressure head rotating in contact with the carrier head, pressure elements in said pressure head for successively closing the open ends of the moulding cylinders, a central piston member within each of the moulding cylinders, plungers within each of the moulding cylinders and concentric with the said central piston member, a stationary shaft at the centre of the carrier head, cam-like means mounted on said shaft for causing the central piston member to be forced outwardly at the time when its moulding cylinder is closed by one of the pressure elements in the pressure head so as to complete the moulding of the bottom of the article being made, and further cam-like means on said shaft for causing the said concentric plungers to be forced outwardly so as to extrude the article being moulded from its moulding cylinder.

4. A rotary press as claimed in claim 1, comprising a central piston member in each one of said moulding cylinders, plungers within each of the moulding cylinders and concentric with the said central piston member, a stationary shaft at the centre of the carrier head, a centre cam on said shaft to actuate the central piston member, and two outer cams on said shaft, one on either side of the centre cam, for actuating the said concentric plungers, 5. A rotary press as claimed in claim 1, comprising a central piston member in each one of said moulding cylinders, plungers within each of the moulding cylinders and concentric with the said central piston member, a normally stationary shaft at the centre of the carrier head, a centre cam loosely mounted on said shaft for actuating the central piston member, two outer cams rigidly connected to said shaft for actuating the said concentric plungers, and means for rotatably adjusting the said shaft so as to vary the operating phase of the two outer cams, without altering the centre cam.

6. A rotary press as claimed in claim 1, comprising means for adjusting the point of commencement of the extrusion stroke, whilst the machine is running, in order that the length of the moulded article may be varied.

7. A rotary press is claimed in claim 1, comprising a centre piston in each one of the moulding cylinders, means for operating said centre piston, a pair of annular plungers in each of the moulding cylinders and surrounding the said centre piston, slots in each moulding cylinder, extensions connected with the annular plungers and passing through said slots, rollers carried by said extensions, a stationary shaft arranged in the centre opening of the carrier head, and a pair of cams upon said shaft with which cams said rollers are adapted to contact in order to actuate the annular plungers.

8. A rotary press as claimed in claim 1, comprising a central piston member in each of the moulding cylinders, inner and outer annular plungers in each of the moulding cylinders and surrounding the said central piston member, an inwardly projecting flange on said inner annular plunger and adapted to engage said central piston member, a slot in said outer annular plunger, an outer projection on said inner annular plunger and extending within said slot, a slot in the carrier head corresponding to each moulding cylinder and communicating therewith, an extension member in each of said slots in the carrier head and rigidly connected to the said outer projection of the inner annular plunger, a roller mounted upon said extension member, a central shaft through the carrier head, and a cam upon said central shaft with which cam said roller contacts.

9. A rotary press as claimed in claim 1, comprising a central piston member in each one of the moulding cylinders, inner and outer annular plungers in each of the moulding cylinders and surrounding the said central piston member, an inwardly projecting flange on said inner annular plunger and adapted to engage said central piston member, a pair of slots in said outer annular plunger and arranged on diametrically opposite sides thereof, a pair of diametrically opposed outer projections on said inner annular plunger and respectively extending within said slots, a pair of slots in the carrier head corresponding to each moulding cylinder and communicating therewith on diametrically opposite sides, a pair of extension members respectively arranged in said slots in the carrier and rigidly connected respectively to the said outer projection of the inner annular plunger, rollers mounted upon said extension members, a central shaft through the carrier head, cams on said central shaft with which cams said rollers contact.

10. A rotary press as claimed in claim 1, comprising a central piston member in each one of the moulding cylinders, inner and outer concentric plungers in each of the moulding cylinders and surrounding the said central piston member, a slot in said outer annular plunger, an outer projection on said inner annular plunger and extending within said slot, a slot in the carrier head corresponding to each moulding cylinder and communicating therewith, an extension member in each of said slots in the carrier head and rigidly connected to the said outer projection of the inner annular plunger, a stationary cam for actuating said extension member, and an abutment surface on said outer concentric plunger adapted to contact with the inner annular plunger when the latter has performed a certain proportion of its outward stroke, whereby the two concentric plungers will be moved as one whole for the remainder of the stroke.

11. A rotary press as claimed in claim 1, comprising a boss projecting outwardly and centrally from the bottom of each one of the moulding cylinders and rigidly connected to the carrier head, a stem passing through a hole in said boss and guided thereby, a piston-head carried at the outer end of said stem, recesses formed at the centre of the carrier head and respectively corresponding to the moulding cylinders, blocks movably mounted in said recesses and respectively connected to said stem, a shaft through the carrier head, and a cam upon said shaft adapted to impart a reciprocating movement to the blocks, and through them to the stems and piston heads.

12. A rotary press as claimed in claim 1, comprising a boss projecting outwardly and centrally from the bottom of each one of the moulding cylinders and rigidly connected to the carrier head, a stem passing through a hole in said boss and guided thereby, an enlarged piston head secured to the end of said stem, a sleeve of somewhat greater length than the said piston head and mounted thereon, an outer and an inner concentric plunger in each of the moulding cylinders and surrounding the said sleeve, an inwardly projecting flange on the inner concentric plunger, and a flange on said sleeve adapted to fit under said inwardly projecting flange on the inner concentric plunger.

13. A rotary press as claimed in claim 1, comprising a boss projecting outwardly and centrally from the bottom of each one of the moulding cylinders and rigidly connected to the carrier head, a stem passing through a hole in said boss and guided thereby, an enlarged piston head secured to the end of said stem, a sleeve of somewhat greater length than the said piston head and mounted thereon, an outer and an inner concentric plunger in each of the moulding cylinders and surrounding the said sleeve, an inwardly projecting flange on the inner concentric plunger, a flange on said sleeve adapted to fit under said inwardly projecting flange on the inner concentric plunger, a ring mounted in the open end of the moulding cylinder, a piston cap member rigidly connected to the said sleeve so as to leave an annular space between it and said ring through which space a plastic material contained in the cylinder may be extruded.

14. A rotary press as claimed in claim 1, comprising a boss projecting outwardly and centrally from the bottom of each one of the moulding cylinders and rigidly connected to the carrier head, a stem passing through a hole in said boss and guided thereby, an enlarged piston head secured to the end of said stem, a sleeve of somewhat greater length than the said piston head and mounted thereon, an outer and an inner concentric plunger in each of the moulding cylinders and surrounding the said sleeve, an inwardly projecting flange on the inner concentric plunger, a flange on said sleeve adapted to fit under said inwardly projecting flange on the inner concentric plunger, a replaceable ring mounted in the open end of the moulding cylinder, a replaceable piston cap member rigidly connected to the said sleeve so as to leave an annular space between it and said ring through which space a plastic material contained in the cylinder may be extruded, the thickness and diameter of said annular space being capable of alteration by changing the sizes of the said replaceable ring and piston cap member.

15. A rotary press as claimed in claim 1, comprising a boss projecting outwardly and centrally from the bottom of each one of the moulding cylinders and rigidly connected to the carrier head, a stem passing through a hole in said boss and guided thereby, a piston head carried by the outer end of said stem, recesses formed at the centre of the carrier head and respectively corresponding to the moulding cylinders, blocks movably mounted in said recesses and respectively connected to said stems, a shaft through the interior of the carrier head, a cam upon said shaft adapted to impart a reciprocating movement to the blocks and through them to the stems and piston heads, an anti-friction roller provided in said cam to form its step, and an offset inner surface on each block to enable it to ride upon said anti-friction roller.

16. In a rotary press as claimed in claim 1, the combination, with a series of radial moulding cylinders, of a plurality of plungers in each one of the said moulding cylinders, a stationary shaft at the centre of the carrier head, cam-like elements mounted on said shaft for causing the plungers, in each cylinder to be moved outwardly in proper succession, and springs mounted within the carrier-head and adapted to effect the inward strokes of the plungers.

17. In a rotary press as claimed in claim 1, the combination, with a series of radial moulding cylinders, of a plurality of plungers in each one of the said moulding cylinders, a central shaft at the centre of the carrier head, and normally stationary, cam-like elements mounted on said shaft for causing the plungers on each cylinder to be moved outwardly in proper succession, means such as worm gearing connected with the central shaft whereby said shaft may be turned to regulate the extrusion, and a scale connected with said means to indicate the adjustment of the machine.

18. A rotary press as claimed in claim 1, comprising a pressure head rotating in contact with the carrier-head, a first set of inner oscillating members mounted within approximately semi-circular seatings arranged around an inner central opening formed in the pressure head, a corresponding second set of outer oscillating members mounted within approximately semi-circular seatings arranged at the periphery of the pressure head, links connecting corresponding inner and outer oscillating members, pressure caps carried by the outer oscillating members, and cam-like means to actuate the inner oscillating members, so that the pressure caps may be adjusted in proper sequence to exert compression successively upon the plastic material contained in the several moulding cylinders as said pressure caps assume an aligned position with each of the said moulding cylinders.

19. A rotary press as claimed in claim 1, comprising a pressure head rotating in contact with the carrier head, a first set of inner oscillating members mounted within approximately semi-circular seatings arranged around an inner central opening formed in the pressure head, a corresponding second set of outer oscillating members mounted within approximately semi-circular seatings arranged at the periphery of the pressure head, links connecting corresponding inner and outer oscillating members, pressure caps carried by the outer oscillating members, projecting nose pieces provided upon the inner oscillating members, and a central cam member positioned in the central opening of the rotary pressure head and adapted to engage said nose pieces, the action of said cam being such that as each pressure cap passes through the position where it is in alignment with the centres of the carrier head and pressure head, its leading edge is suitably adjusted with relation to its trailing edge in order to close the open end of its corresponding moulding cylinder, for a short time after the aligning position is passed, such cam continuing to adjust the pressure cap whilst the bottom of the article being made is subjected to pressure and afterwards adjusting the pressure cap so that its leading edge relative to its trailing edge is in position for the next pressure operation.

20. A rotary press as claimed in claim 1, comprising a pressure head rotating in contact with the carrier head, pressure elements in said pressure head for successively closing the open ends of the moulding cylinders, worm wheels of equal size fitted to the rotary pressure head and to the carrier head respectively, and worm gearing arranged between said worm wheels and adapted to drive same at equal speeds.

21. A rotary press as claimed in claim 1, comprising a segmental feeding chamber fed from the hopper and adapted to fill each of the moulding cylinders with plastic material, an adjustable valve fitted to said segmental feeding chamber and adapted to lead back any excess of plastic material into the hopper, and a scraper bar fitted to the end of said segmental chamber in order that the plastic material in each charged cylinder will be left with a convex surface.

22. A rotary press as claimed in claim 1, comprising a pressure head rotating in contact with the carrier head, pressure caps in said pressure head which are so operated as to co-act successively with the open ends of the moulding cylinders so as to form a V-shaped jaw through which any excess of plastic material is spewed back as the sides of the jaw gradually close upon the open end of the cylinder, and a passageway for returning the spewed back plastic material to the hopper.

23. A rotary press as claimed in claim 1, comprising a pressure head rotating in contact with the carrier head, pressure caps in said pressure head which are so operated as to co-act successively with the open ends of the moulding cylinders to mould the bottom of the article, a "knife" arranged tangentially to the carrier head and adapted to "true" the bottom of the article after the same has been acted upon by a pressure cap to mould same and a tray secured to said knife to discharge from the machine any excess plastic material which has been cut off by the knife.

24. A rotary press for the simultaneous stage by stage manufacture of hollow earthenware articles, comprising a rotary carrier head, a series of moulding cylinders in said head, a hopper for successively filling each of said moulding cylinders with plastic material, means for subsequently compressing said plastic material within the moulding cylinder to partly mould the article so as to form a base connected to a thick annular wall both of plastic material means whereby said thick annular wall of plastic material is after that subjected to extrusion to form the relatively thin annular wall of the hollow earthenware article, a pair of quadrant plates which are positioned about the lower half of each moulding cylinder so as to form a semi-circular cradle to receive and support the article while it is being extruded, and a travelling conveyor to successively receive and remove the completed articles.

25. A rotary press for the simultaneous stage by stage manufacture of hollow earthenware articles, comprising a rotary carrier head, a series of moulding cylinders in said head, a hopper for successively filling each of said moulding cylinders with plastic material, means for subsequently compressing said plastic material within the moulding cylinder to partly mould the article so as to form a base connected to a thick annular wall both of plastic material, means whereby said thick annular wall of plastic material is after that subjected to extrusion to form the relatively thin annular wall of the hollow earthenware article, a pair of quadrant plates which are positioned about the lower half of each moulding cylinder so as to form a semi-circular cradle to receive and support the article while it is being extruded, a set of four quadrant cutters mounted in connection with said pair of quadrant plates, means for actuating said cutters so that, as the quadrant plates come into position to support the article being made, the cutters are caused to surround said article, means whereby the cutter knives are automatically actuated when extrusion is completed so as to sever the ring of clay, which projects from the mouth of the moulding cylinder and through which is suspended the completely extruded and moulded article, and a travelling conveyor to successively receive and remove the completed articles.

26. A rotary press as claimed in claim 25, comprising means for adjusting the height of the travelling conveyor so as to correspond with any adjustment effected to vary the length of the article being moulded.

27. In a rotary press as claimed in claim 25, a pair of trip levers for actuating said cutter knives, a pair of adjustable stops carried on the machine frame and adapted to engage the trip levers so as to momentarily operate the cutter knives to give them first a radial movement followed by a short slicing movement.

28. In a rotary press as claimed in claim 24, flanges supporting and forming part of said carrier head, housings carrying said quadrant plates and arranged in pairs one on either side of each moulding cylinder and so mounted on said flanges as to be capable of assuming either tangential or transverse positions relative to the carrier head, springs to actuate said housings to cause them to assume their transverse positions to form a cradle during the extrusion of the article in the corresponding moulding cylinder, and stationary elements to automatically actuate said housings to move them out of their transverse positions after the extrusion of the article in the corresponding moulding cylinder.

In testimony whereof I have signed my name to this specification.

EDMUND WILLIAM LEIGH.